(12) United States Patent
Pfister

(10) Patent No.: US 6,286,192 B2
(45) Date of Patent: Sep. 11, 2001

(54) CLAMP ASSEMBLY

(76) Inventor: Joel W. Pfister, 4967 Kensington Gate, Shorewood, MN (US) 55331

(*) Notice: Subject to any disclaimer, the term of this patent is extended or adjusted under 35 U.S.C. 154(b) by 0 days.

(21) Appl. No.: 09/736,778

(22) Filed: Dec. 14, 2000

Related U.S. Application Data

(62) Division of application No. 09/398,970, filed on Sep. 17, 1999, now Pat. No. 6,161,262, which is a division of application No. 09/276,879, filed on Mar. 26, 1999, now Pat. No. 6,119,317.

(51) Int. Cl.[7] .............................. A47B 96/06; F21L 15/04
(52) U.S. Cl. ...................... 24/514; 24/569; 548/233.41; 548/125.1
(58) Field of Search .............................. 24/514, 525, 541, 24/569, 542; 248/125.1, 297.21, 223.41; 269/77, 43

(56) References Cited

U.S. PATENT DOCUMENTS

| | | | |
|---|---|---|---|
| 544,216 | * | 8/1895 | Droste ........................ 248/125.1 X |
| 1,234,038 | * | 7/1917 | Kelley ............................ 24/569 X |
| 2,547,932 | * | 4/1951 | Downs, Jr. ...................... 24/569 X |
| 2,712,167 | * | 7/1955 | Blanchard ........................ 24/569 |
| 3,015,177 | * | 2/1962 | Hembd ...................... 248/233.41 X |
| 4,725,030 | * | 2/1988 | Miller et al. .................. 248/297.21 |
| 5,667,185 | * | 9/1997 | Maglica ..................... 248/233.41 X |
| 5,769,556 | * | 6/1998 | Colley ........................... 24/569 X |

* cited by examiner

*Primary Examiner*—Robert J. Sandy

(57) ABSTRACT

A clamp assembly for installation at any position along the length of a slot defined by surfaces of a host structure or other structure. The clamp assembly either can receive a mounting rod for supporting objects or can itself include a mounting rod for supporting objects. In one embodiment the clamp assembly includes a two-piece clamp body composed of a pair of opposing substantially mirror-image jaws each having an inner surface with an arcuate channel and a tooth juxtaposing the arcuate channel. The arcuate channels cooperate to accept and frictionally engage a mounting rod to be affixed to the host structure, and the teeth are for entering into a slot defined by surfaces of the host structure. A tightening member is provided for forcing the jaws together. In an alternate embodiment the clamp assembly includes a one-piece clamp body and a mounting rod. The one-piece clamp body includes engagement tabs for entering into a slot defined by surfaces of the host structure and a threaded hole for receiving a threaded end of the mounting rod, which serves as a tightening member.

3 Claims, 11 Drawing Sheets

CLAMP ASSEMBLY

CROSS REFERENCES TO APPLICATIONS

This application is a division of Ser. No. 09/398,970 filed Sep. 17, 1999, U.S. Pat. No. 6,161,262, which is a division of Ser. No. 09/276,879 filed Mar. 26, 1999, U.S. Pat. No. 6,119,317.

BACKGROUND OF THE INVENTION

1. Field of the Invention

The present invention is for a clamp assembly. More particularly, the present invention pertains to a clamp assembly which has utility especially in conjunction with display system of the type which include a host structure which supports objects to be displayed, the host structure including surfaces defining a slot and the clamp assembly including structure enabling it to be readily and easily mounted to the slot. The clamp assembly can receive a mounting rod or can itself include a mounting rod; and the mounting rod can support any type of structure, as required.

2. Description of the Prior Art

Clamp assemblies used in prior art display systems or other systems have usually been dedicated to a single purpose, have lacked adjustability, and have not been readily and easily installed into a slot structure on a host structure. In other words, prior art clamp assemblies for display systems or other systems were intended for a single use, were not easily or readily installed, and allowed little, if any, adjustability.

The present invention overcomes the disadvantages of the prior art by providing a clamp assembly which is versatile and is readily adjustable and installable by utilizing opposing jaws or a pair of engagement tabs which can secure at a location anywhere along a slot in a host structure, such as an extruded geometrically configured tube.

SUMMARY OF THE INVENTION

The general purpose of the present invention is to provide a clamp assembly which can be readily and easily installed in a slot in a host structure or other structure at any position along the slot, including at the top or at the bottom of the slot, and which is versatile and adjustable.

The host structure can be of numerous shapes and forms, but is herein exemplified by an extruded geometrically configured tube having a slotted surface. The host structure can have any number of slots, and in the example herein illustrated four slots are provided. Each slot is defined by a portion of the surface of the extruded geometrically configured tube, opposed struts extending outwardly from the surface, and opposing segmented arcuate portions supported on the ends of the struts.

According to a first embodiment of the present invention, there is provided for installation in a slot of the host structure a clamp assembly which includes a two-piece clamp body composed of a pair of opposing substantially mirror-image jaws each having an inner surface with an arcuate channel and a tooth juxtaposing the arcuate channel. The arcuate channels are for cooperating to accept and frictionally engage a mounting rod to be affixed to the host structure by the clamp assembly, and the teeth are for entering into a slot of the host structure. The clamp assembly further includes a tightening member, such as a thumbscrew, which extends through a body hole in one of the jaws and engages into a threaded hole in the other of the jaws. When a mounting rod is received by the arcuate channels in the jaws, the teeth of the jaws lie to one side of the mounting rod and the tightening member lies to the opposite side of the mounting rod. So positioned, the mounting rod serves as a fulcrum, and upon rotating the tightening member, the inner surfaces of the jaws on the tightening member side of the mounting rod are forced together, whereas the teeth on the opposite side of the mounting rod expand or move away from each other and come into frictional engagement with the segmented arcuate portions of the host structure, thus affixing the clamp assembly and mounting rod securely to the host structure.

According to an alternate embodiment, there is provided for installation in a slot of the host structure a clamp assembly which includes a one-piece clamp body and a mounting rod which serves as a tightening member. The one-piece clamp body includes engagement tabs for entering into a slot of the host structure and a threaded hole for receiving threads located at one end of the mounting rod. By placing the engagement tabs of the one-piece clamp body into a slot of the host structure and then turning the threads of the mounting rod into the threaded hole in the one-piece clamp body, the engagement tabs are brought into frictional engagement with the segmented arcuate portions of the host structure, thus affixing the alternate embodiment clamp assembly securely to the host structure.

Significant aspects and features of the present invention include a clamp assembly which features mid-slot installability, adjustability, versatility, and which is not limited to one particular geometrical orientation. That is, the extruded geometrically configured tube or other host structure which supports the clamp assembly and other devices, such as a mounting rod, can either be vertical, horizontal, or at an angle, and of any length, as there is no limit as to the length of an extrusion in theory. The mounting rod which is supported by the clamp assembly or which forms a part of the clamp assembly can take any type of geometrical configuration, can support any object, and can have any type of geometrical structure secured thereto.

Another significant aspect and feature of the present invention is that once a host structure such as an extruded geometrically configured host tube is positioned, such as on a base, vertically or horizontally, the clamp assembly can be engaged and disengaged easily and effectively at any time.

Yet another significant aspect and feature of the present invention is a clamp assembly having opposing jaws operated about a pivot or fulcrum rod where outward ends of the jaws are forced apart to engage a slot.

Still another significant aspect and feature of the present invention is a clamp assembly having jaw ends which are rounded to promote jaw self-positioning during the initial installation step.

A further significant aspect and feature of the present invention is a clamp assembly constructed of two jaws which are held together, in part, by one or more spring-like sponge rubber pads.

Having thus described embodiments and significant aspects and features of the present invention, it is the principal object of the present invention to provide a clamp assembly which has exceptional versatility and which can be readily and easily installed to a slot in a host structure or other structure at any position therealong.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
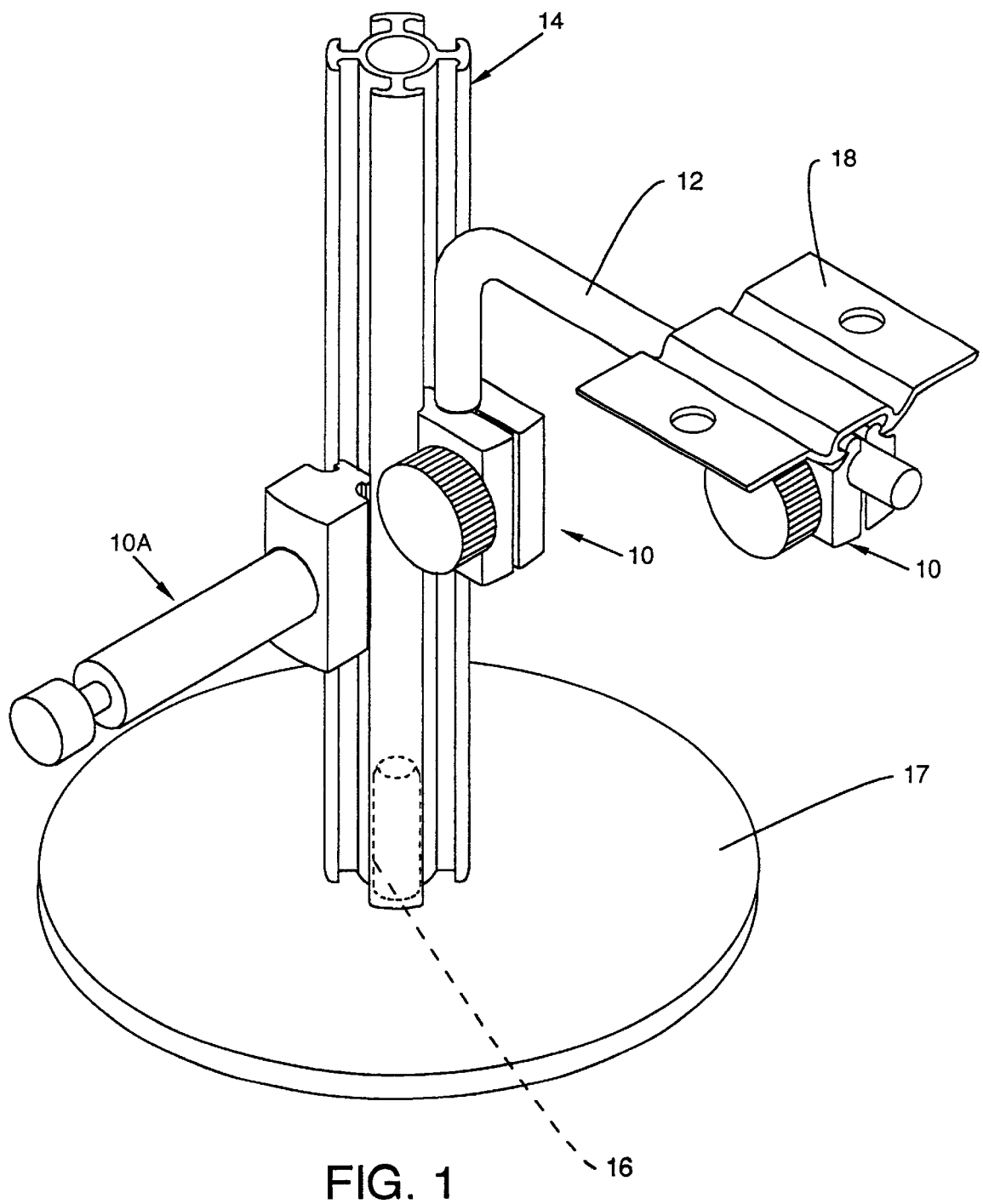
FIG. 1 illustrates an isometric view of a host structure with two different styles or embodiments of clamp assemblies each constructed according to the present invention installed thereon, one of the clamp assemblies (first embodiment) supporting a mounting rod to which is attached an identical clamp assembly supporting an auxiliary mounting structure, and the other of the clamp assemblies (alternate embodiment) itself including a mounting rod.

FIG. 1 illustrates an isometric view of a clamp assembly 10 constituting a first embodiment of the present invention and a clamp assembly 10A constituting an alternate embodiment of the present invention both installed on a host structure, which in this case for the purpose of example and illustration is an extruded geometrically configured tube 14. The extruded geometrically configured tube 14 can be supported or mounted in a variety of manners but, for the purpose of example, is shown to be slidingly secured over and about a post 16 extending vertically upwardly from a base 17. The extruded geometrically configured tube 14 includes, as would other host structures, one or more slots, in the present instance four slots, for the accommodation and engagement of one or more -piece clamp body, described in detail later, that functions to secure a mounting rod 12, which is separate from the clamp assembly itself, to the host structure. The mounting rod 12 can assume various geometrical attributes and shapes to accommodate a variety of items for display or to accommodate yet other devices. As shown, the mounting rod 12 is angular and has a horizontal portion to which is secured another clamp assembly 10 which in turn supports an auxiliary mounting structure 18 having a slot located therein which replicates the essential shape and geometry of those slots in the host structure, but which is not limited to that precise shape and geometry. The clamp assembly 10A, in contrast to the clamp assembly 10, involves a one-piece clamp body rather than a two-piece clamp body, and itself includes a mounting rod for the accommodation of various items for display. The mounting rod can assume various shapes and forms, but for purposes of example and illustration is depicted as a cylindrical construction. Clamp assembly 10A is described in detail later.

Figure 2:
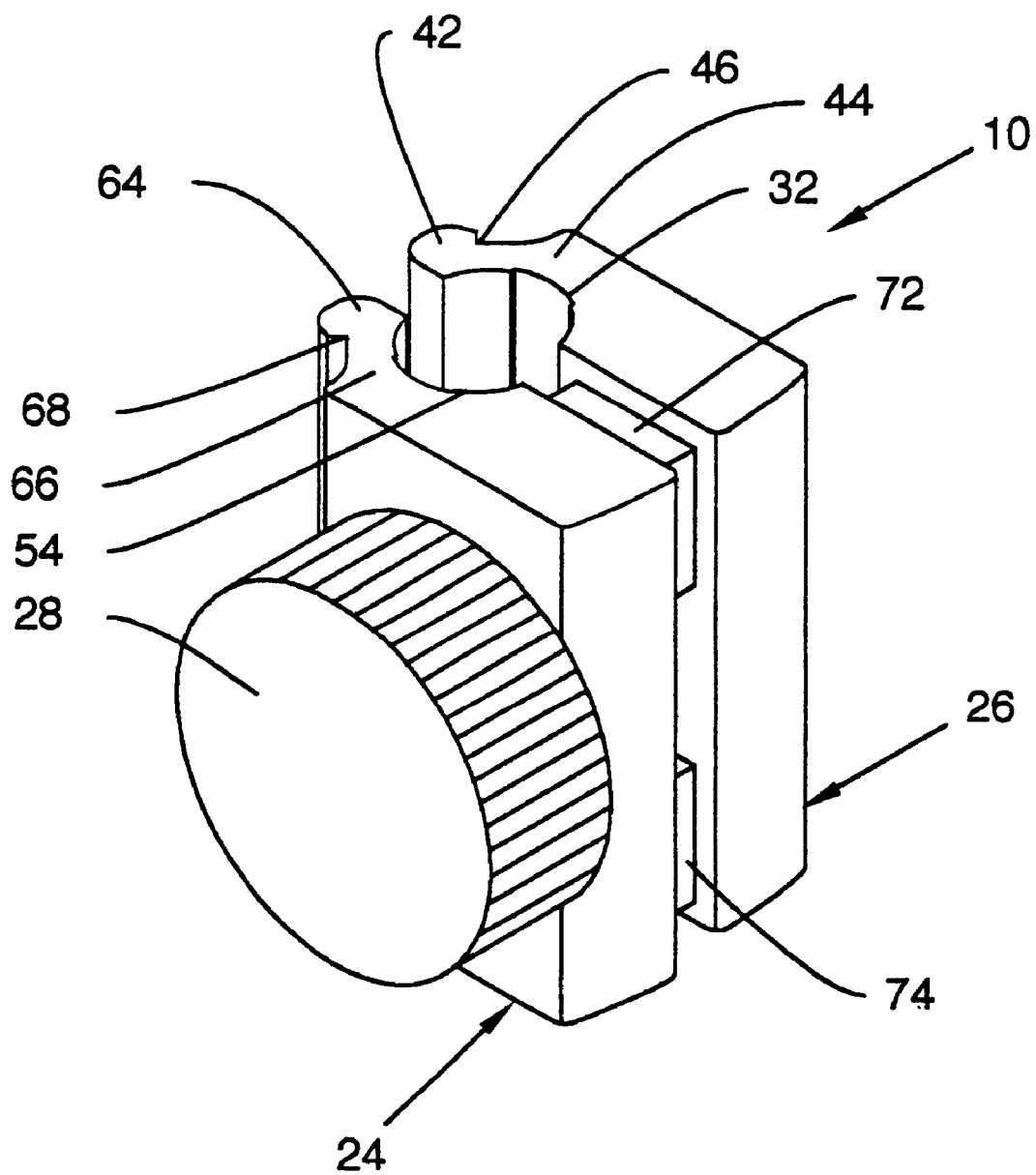
FIG. 2 illustrates an isometric view of the first embodiment clamp assembly.

FIG. 2 illustrates an isometric view of the clamp assembly 10. The clamp assembly 10 includes a two-piece clamp body composed of opposing left and right jaws 24 and 26, respectively, substantially being mirror images of each other and including engagement means in the form of teeth 42 and 64 for entering into a slot defined by surfaces of a host structure. Tightening means such as a screw member, herein shown as a thumbscrew including a shaft 50 (FIG. 3) and a knurled actuating knob 28 at one end of the shaft 50, extends through the left and right jaws 24 and 26, respectively, to draw together and mutually position the left jaw 24 with respect to the right jaw 26 to secure the clamp assembly 10 to a rod, such as mounting rod 12, and to bring the teeth 42 and 64 into tight engagement with the surfaces of the host structure defining the slot to thereby affix the clamp assembly 10 securely to the host structure.

Figure 3:
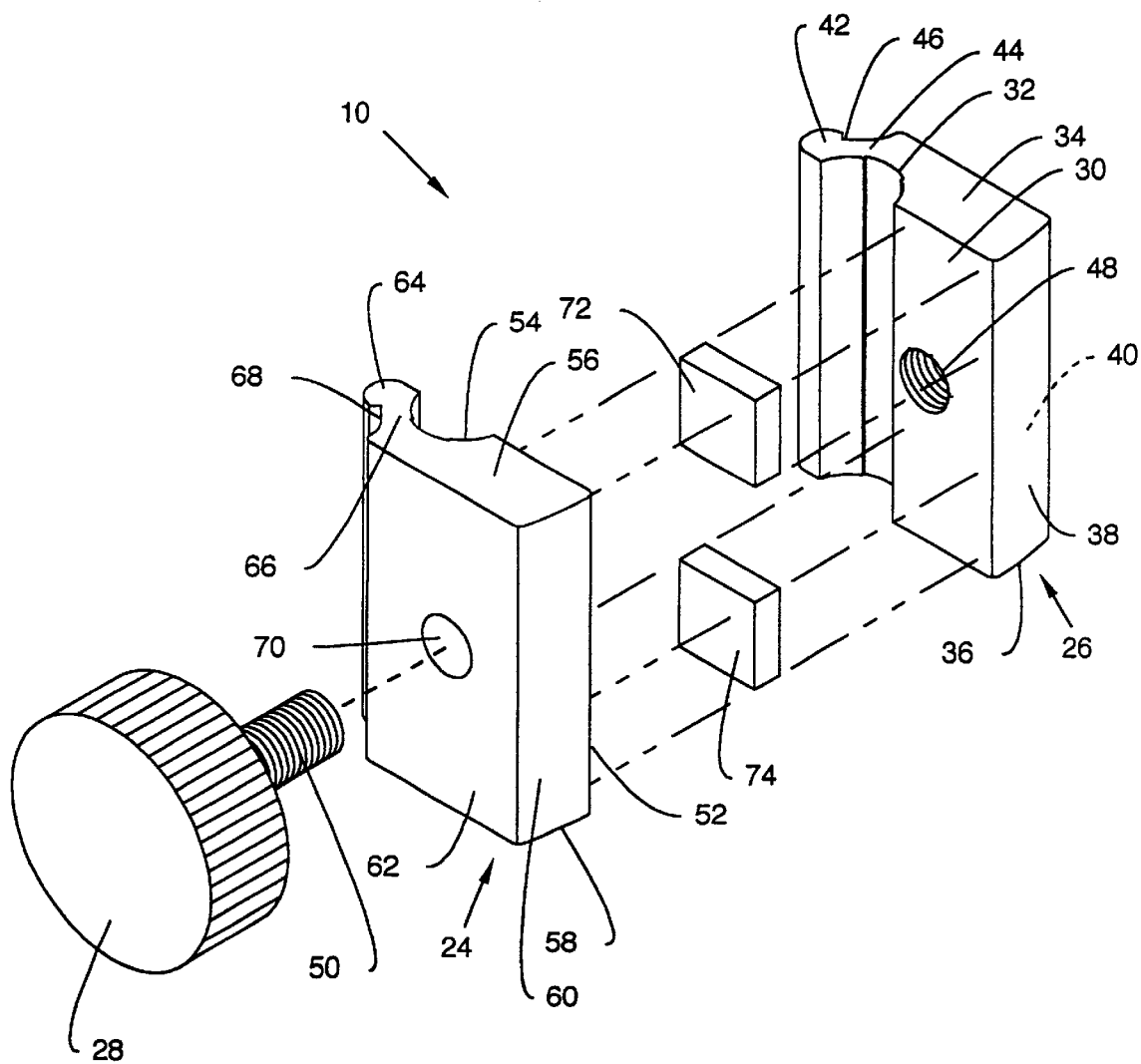
FIG. 3 illustrates an exploded view of the first embodiment clamp assembly.
Figure 4:
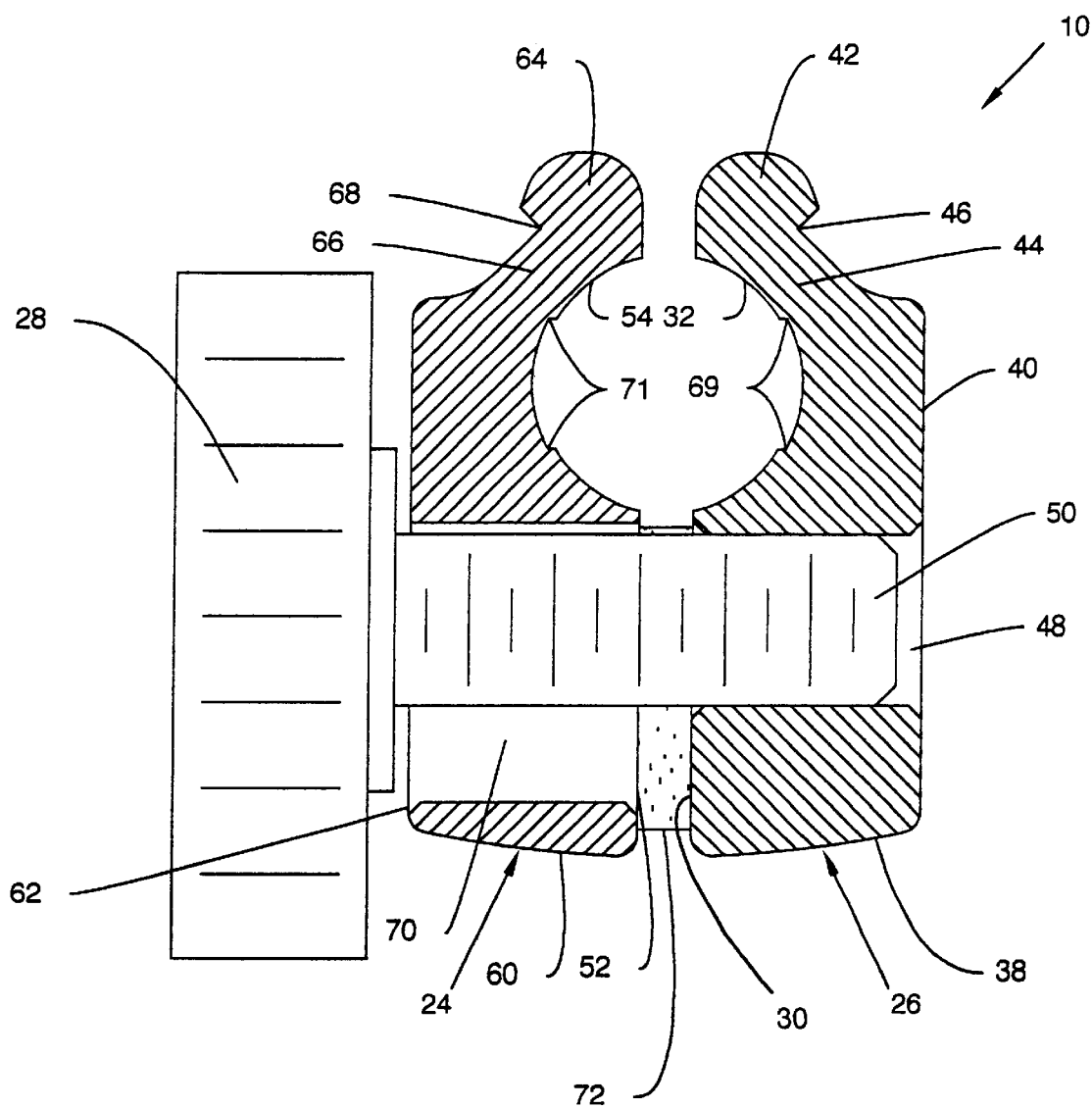
FIG. 4 illustrates a cross sectional top view of the first embodiment clamp assembly.

FIG. 3 illustrates an exploded view of the clamp assembly 10. The right jaw 26, substantially a mirror image of the left jaw 24, is now described. The right jaw 26, which can be an extrusion preferably of steel, aluminum, hard plastic or any other such suitable material, includes an inner planar surface 30 having an arcuate channel 32, which is less than a 180° arc, oriented vertically thereupon and extending between a top planar surface 34 and a bottom planar surface 36. The right jaw 26 also includes an outwardly facing planar end surface 38 and an exterior planar surface 40, best shown in FIG. 4. An engagement means in the form of a tooth 42 having a rounded profile juxtaposes the arcuate channel 32. The tooth 42 is supported by a strut 44 which comprises one side of the arcuate channel 32. A groove 46 is located between the tooth 42 and the strut 44. A threaded hole 48 extends through the inner planar surface 30 and into the body of the right jaw 26 to accommodate a tightening means, here shown as a thumbscrew having a threaded shaft 50 which extends from an actuating knob 28. With reference to FIGS. 3 and 4 and other figures herein, the opposing left jaw 24 is similarly configured to include an inner planar surface 52, an arcuate channel 54, which is less than a 180° arc, a top planar surface 56, a bottom planar surface 58, an outwardly facing planar end surface 60, an exterior planar surface 62, an engagement means in the form of a tooth 64, a strut 66, a groove 68, and a body hole 70 through which the threaded shaft 50 passes. Optional sponge rubber pads 72 and 74 are held with adhesive to the inner planar surface 30 of the right jaw 26 at a location outward from the arcuate channel 32 and to a corresponding position on the inner planar surface 52 of the left jaw 24. The sponge rubber pads 72 and 74 function to (1) secure the left jaw 24 to the right jaw 26 to keep the jaws mutually attached to each other so that the person operating the clamp assembly does not end up with a handful of loose parts, and (2) provide a spring bias action to force the teeth 42 and 64 together during placement of the clamp assembly 10 in a slot.

FIG. 4 illustrates a cross sectional top view of the clamp assembly 10. Illustrated in particular is the separated alignment of the left jaw 24 to the right jaw 26. Attention is also called to the arcuate channels 32 and 54 in that the arcs described by each are less than 180° and are of an appropriate radius to accommodate and to contact a greater portion of the circumference of the mounting rod 12 on a partial circumference basis, thus allowing spaces to be maintained between the teeth 42 and 64, and more importantly, between the inner planar surfaces 30 and 52. Undercuts of slightly larger radius are also provided on the arcuate channels 32 and 54 to provide one or more gripping edges 69 and 71 for enhanced frictional engagement of the jaws 26 and 24 to the mounting rod 12.

MODE OF OPERATION

Figure 5:
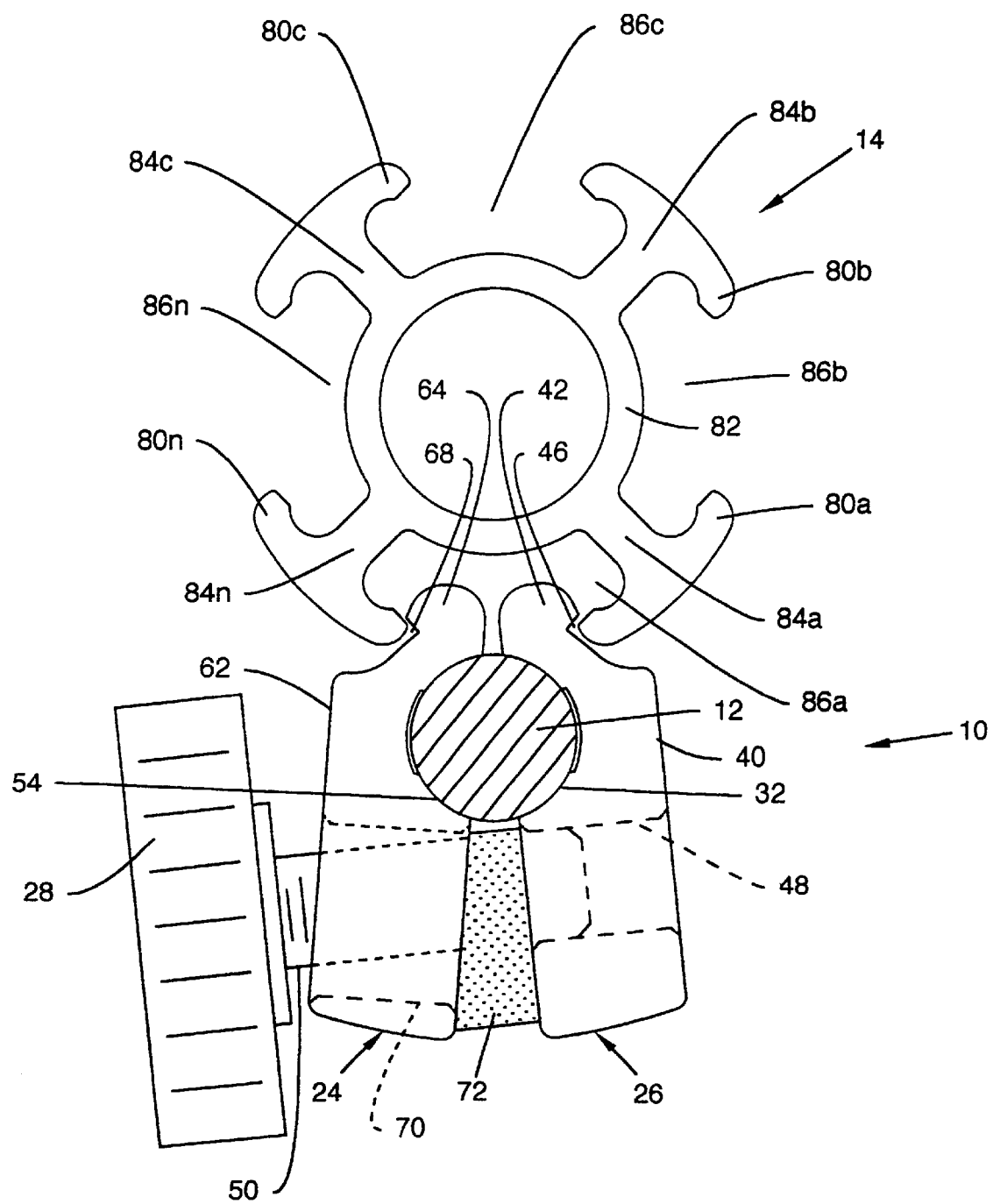
FIG. 5 illustrates a top view of the first step of fastening the first embodiment clamp assembly along with a mounting rod to a host structure.

FIG. 5 illustrates a top view of the first step of fastening the clamp assembly 10 and securing a mounting rod 12 to a host structure. The host structure, in this case the extruded geometrically configured tube 14, includes segmented arcuate portions 80a–80n secured to a central cylindrical structure 82 by struts 84a–84n. Slot 86a is formed, in general and for example, between the ends of segmented arcuate portions 80a and 80n, by struts 84a and 84n, and the portion of the cylindrical structure 82 therebetween. In the example, the slots 86a–86n assume an arc-like profile, and any suitably shaped slot can be used against which and into which the teeth 42 and 64 and corresponding grooves 46 and 68 are inserted, engaged and secured. The insertion is initiated by loosely inserting the mounting rod 12 in the arcuate channels 32 and 54 in the jaws 26 and 24 while the actuating knob 28 is rotated to back out the threaded shaft 50 to allow angular flexing of the jaw 26 and 24 with respect to one another about the mounting rod 12, which acts as a fulcrum or pivot. The teeth 42 and 64, each having a round-like profile, are inserted into the slot 86a to a position as illustrated. The round-like profile presented by the teeth 42 and 64 can, if not already touchingly positioned, impinge the outwardly located ends of the corresponding segmented arcuate portions 80a and 80n to maneuver the teeth 42 and 64 into close mutual proximity or even into intimate contact to provide a minimum profile so that passage of the teeth 42 and 64 into the slot 86a can be readily and easily accomplished. The body hole 70 in the left jaw 24 is sized to allow sufficient rotation of the left jaw 24 about the mounting rod 12 without interference of the threaded shaft 50.

Figure 6:
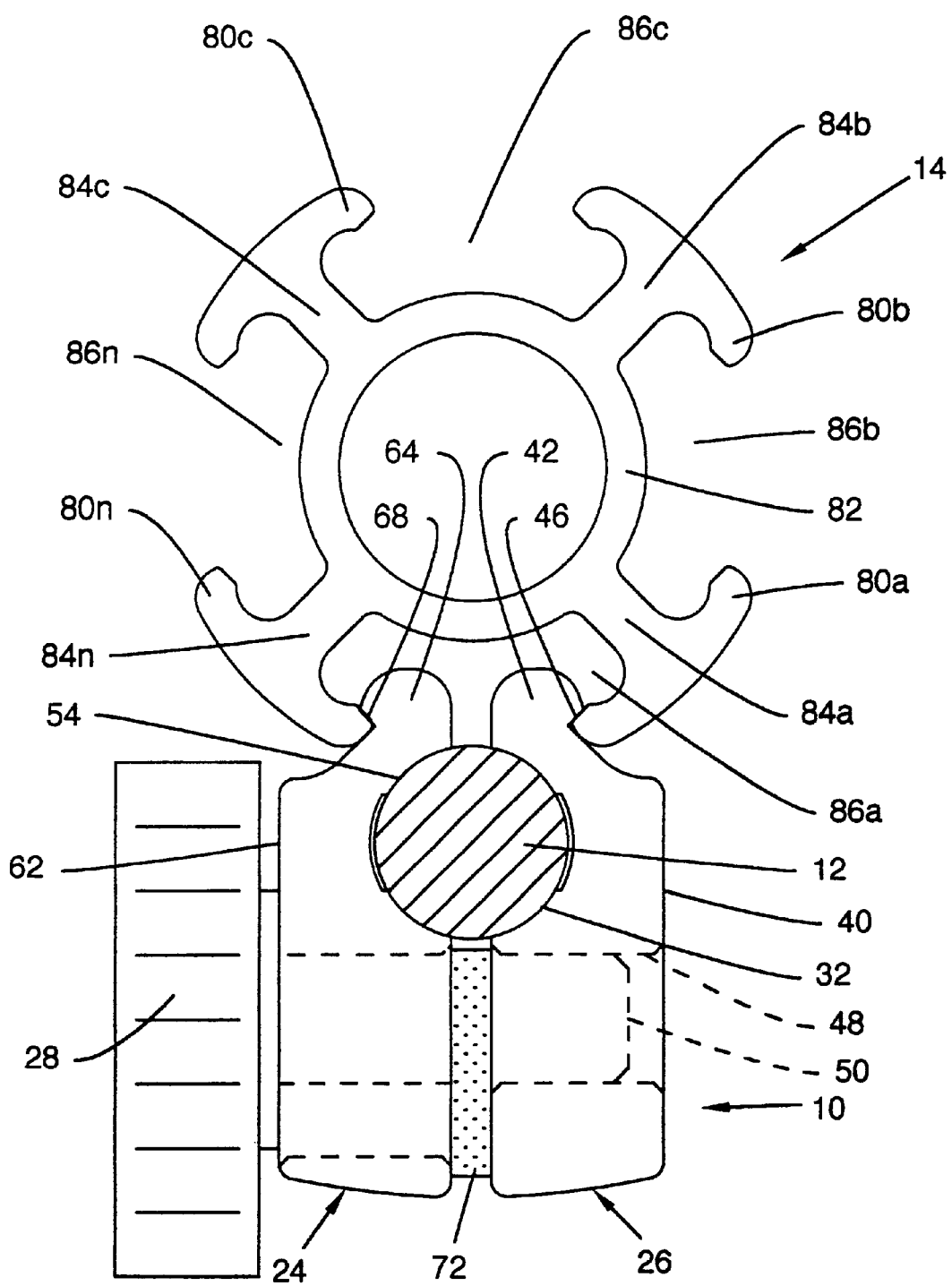
FIG. 6 illustrates a top view of the final step of fastening the first embodiment clamp assembly along with the mounting rod to the host structure.

FIG. 6 illustrates a top view of the final step of fastening the clamp assembly 10 and the mounting rod 12 to the host structure extruded geometrically configured tube 14. The actuating knob 28 is turned to reposition the left jaw 24 and the right jaw 26 in opposition about the mounting rod 12, which acts as a pivot and as a fulcrum. The actuating knob 28 is brought to bear against the exterior planar surface 62 of the left jaw 24, thus imparting a counterclockwise movement of the left jaw 24 about the mounting rod 12, thereby positioning the groove 68 against one end of the segmented arcuate portion 80n of the extruded geometrically configured tube 14. At the same time, the rotation of the threaded shaft 50 repositions the right jaw 26 in a clockwise direction about the mounting rod 12, thereby positioning the groove 46 against one end of the segmented arcuate portion 80a of the extruded geometrically configured tube 14. Further tightening of the knob 28 ensures positive engagement of the jaws 24 and 26 with the slot 86a and also increases pressure across the jaws 24 and 26 to ensure suitable frictional engagement of the jaws 24 and 26 to the mounting rod 12 therebetween.

ALTERNATIVE EMBODIMENT

Figure 7:
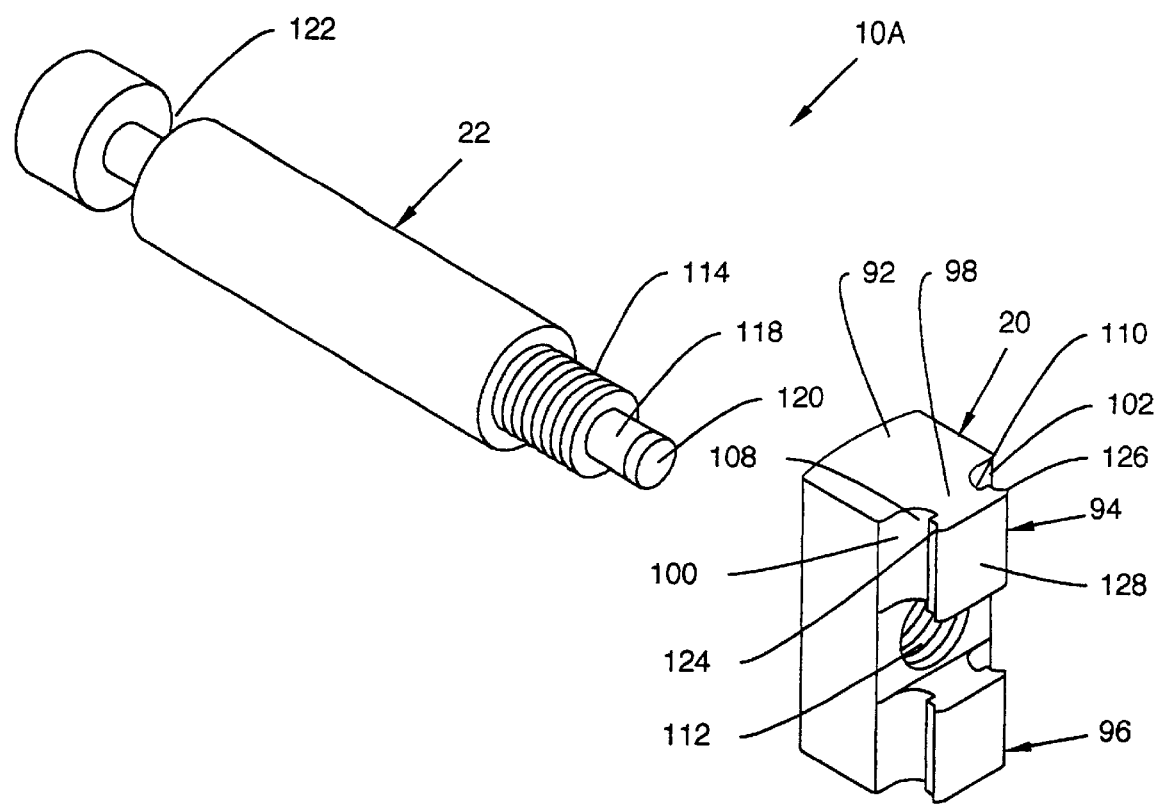
FIG. 7 illustrates an isometric view of the alternate embodiment clamp assembly.

FIG. 7, an alternative embodiment, illustrates an isometric view of the clamp assembly 10A. The clamp assembly 10A includes a one-piece clamp body 20 and a mounting rod 22. The one-piece clamp body 20 includes a block member 92 having engagement means in the form of mirror-like similarly configured upper and lower engagement tabs 94 and 96 extending outwardly therefrom for entering into a slot defined by surfaces of a host structure. The mounting rod 22 serves both as a tightening means for bringing the upper and lower engagement tabs 94 and 96 into tight engagement with the surfaces of the host structure defining the slot thereof, to thereby affix the clamp assembly 10A securely to the host structure, and as a support upon which various items can be mounted for display or other purposes. The mounting rod 22 and one-piece clamp body 20 can be fashioned of aluminum, steel, hard plastic or the like. The upper and lower engagement tabs 94 and 96 are fashioned to engage a slot, such as slot 86c of the host structure 14 or other such slot. The upper engagement tab 94, being similar in design and function to the lower engagement tab 96, is supported by a strut 98 extending outwardly from the block member 92. The strut 98 includes opposing curved sides 100 and 102 which intersect opposing flat surfaces 104 and 106, respectively, of the upper engagement tab 94 (FIG. 8) to subsequently form angular access grooves 108 and 110 which are instrumental during the initial engagement step in the securing of the upper and lower engagement tabs 94 and 96 to a slot. Opposing angled tabs 124 and 126 located at the edges of a planar surface 128 of the upper engagement tab 94 are utilized to contact the ends of segmented arcuate portions, such as the ends of segmented arcuate portions 80b and 80c, as illustrated in FIG. 9. The structure of the lower engagement tab 96, which is identical to the upper engagement tab 94, is not described for purpose of brevity. A horizontally aligned threaded hole 112 extends partially through the block member 92 to accommodate threads 114 located at one end of the mounting rod 22. A recess 116 (FIG. 8) aligns concentrically to the threads 114 to accommodate the largest radius of the mounting rod 22. A small radius protrusion 118, having an optional plastic tip element 120 fastened thereto, extends from the region of the threads 114. A groove 122 is provided at the outward end of the mounting rod 22 to accommodate an external attachment fixture.

Figure 8:
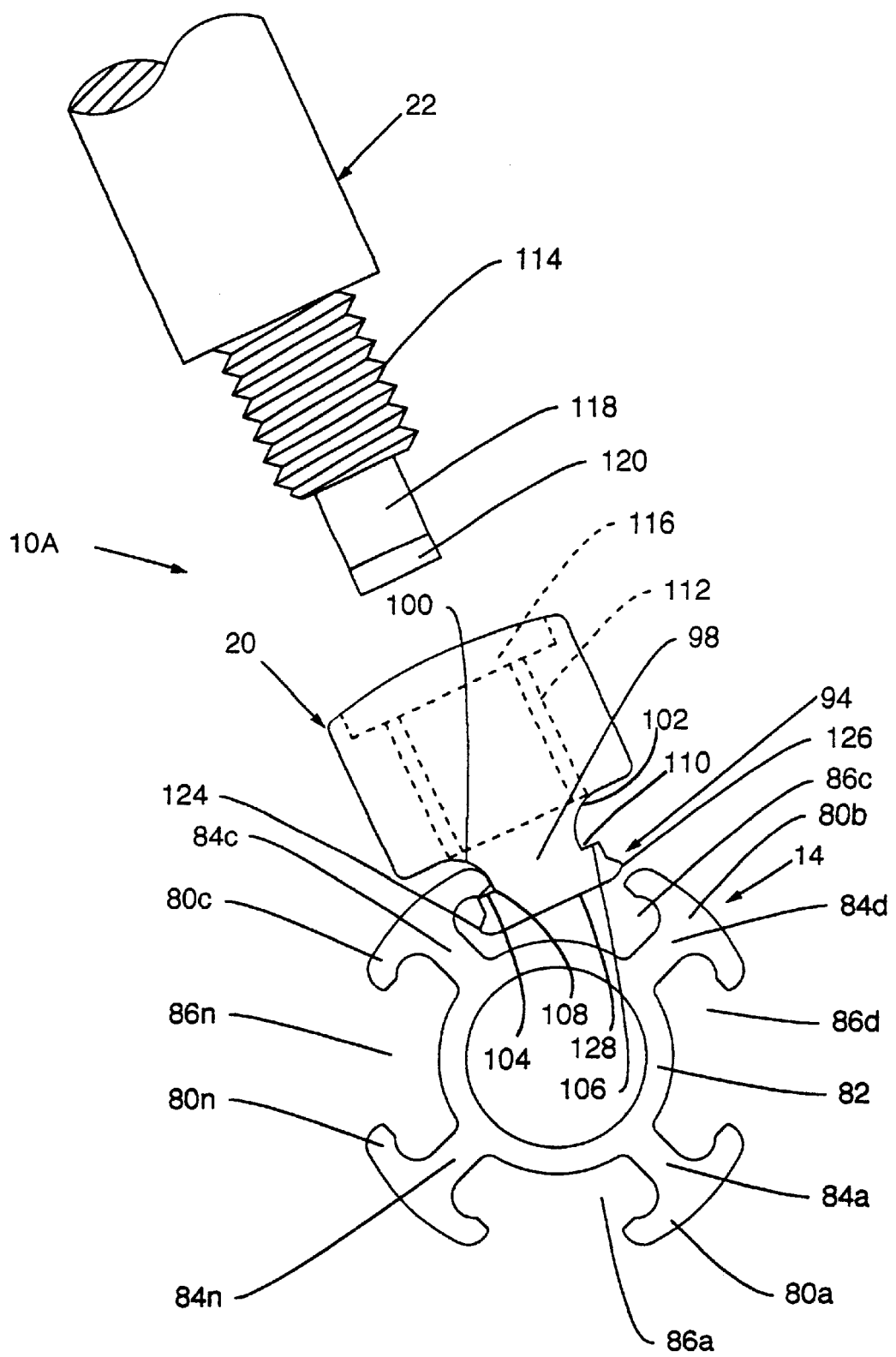
FIG. 8 illustrates a top view of the first step of fastening the alternate embodiment clamp assembly to a slot in a host structure.
Figure 9:
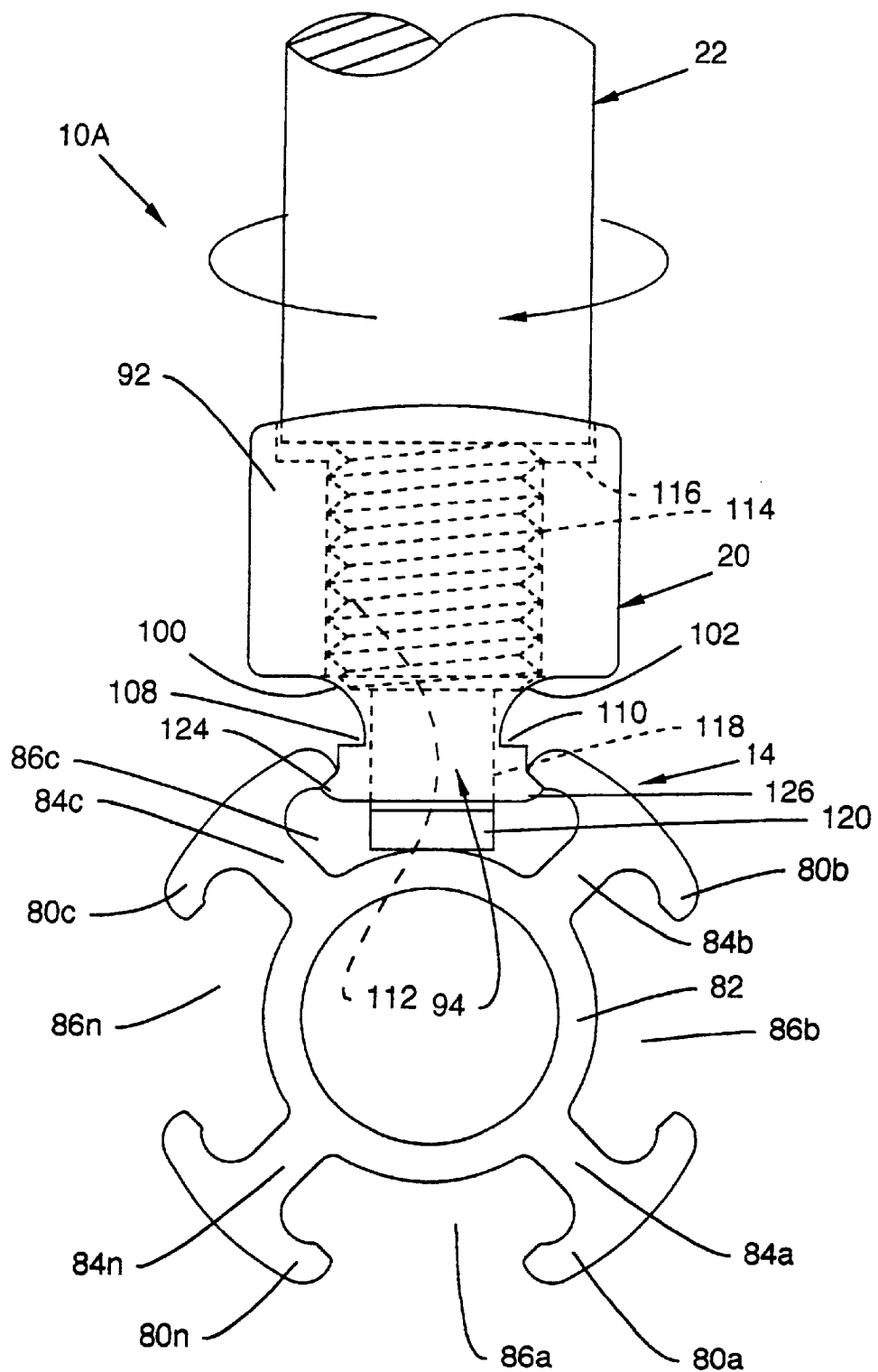
FIG. 9 illustrates a top view of the final step of fastening the alternate embodiment clamp assembly to a slot in the host structure.

FIG. 8 illustrates a top view of the first step in securing the c;amp assembly 10A to a slot such as slot 86c of the extruded geometrically configured tube 14. The mounting rod 22 is not shown as being engaged with the threaded hole 112 during the initial engagement, but may be so engaged, if desired, for initial insertion. The one-piece clamp body 20 is first positioned canted off center, as illustrated. The access grooves on the same sides of the upper and lower engagement tags 94 and 96, such as access groove 108, are positioned at an angle into the slot 86c and then brought to bear against the near end of the adjacent segmented arcuate portion 80c. This allows the geometry of the upper and lower engagement tabs 94 and 96, which at this time are canted, full subsequent access to the interior of slot 86c. Once the upper and lower engagement tabs 94 and 96 are positioned thusly, the one-piece clamp body 20 can be rotated fully into direct alignment within the slot 86c, as shown in FIG. 9.

FIG. 9 illustrates a top view of the final step of fastening the clamp assembly 10A to a slot 86c of the extruded geometrically configured tube 14. After repositioning the one-piece clamp body 20 into full and direct alignment in the slot 86c, the mounting rod 22 is turned to advance the plastic tip element 120 (rod end) into engagement with the cylindrical structure 82. This action forces the block member 92 outwardly from the center and along the threads 114 to outwardly position the angled tabs 124 and 126 of the upper and lower engagement tabs 94 and 96 into tight engagement against the appropriate ends of the segmented arcuate portions 80b and 80c. The upper and lower engagement tabs 94 and 96 are thusly positioned in frictional engagement to lock the clamp assembly 10A composed of the one-piece clamp body and the mounting rod 22 to a slot structure.

Figure 10:
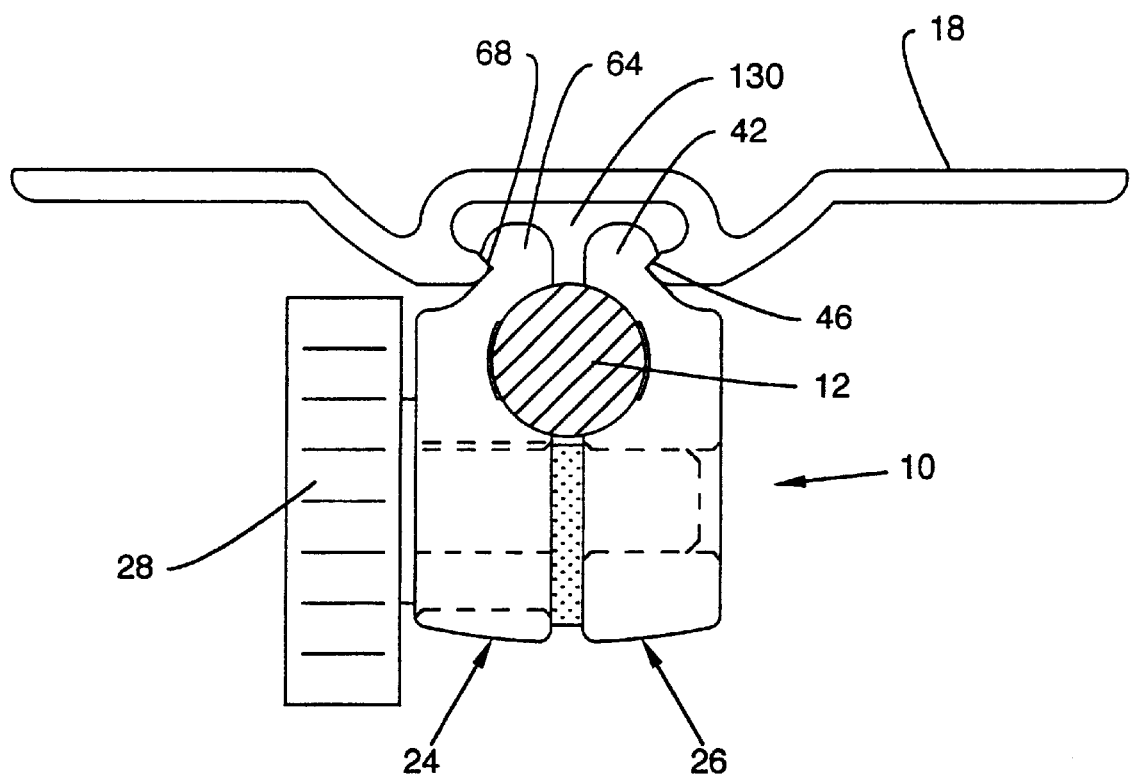
FIG. 10 illustrates a top view of the first embodiment clamp assembly securing a mounting rod to an auxiliary mounting structure; and, FIG. 11 illustrates a top view of both embodiments of clamp assemblies consistent with the teachings of the present invention secured to a host structure.

FIG. 10 illustrates a top view of the clamp assembly 10, the present invention, securing a mounting rod 12 to an auxiliary mounting structure 18, having a slot 130 having attributes which allow attachment of the clamp assembly 10, as well as the clamp assembly 10A, thereto.

Figure 11:
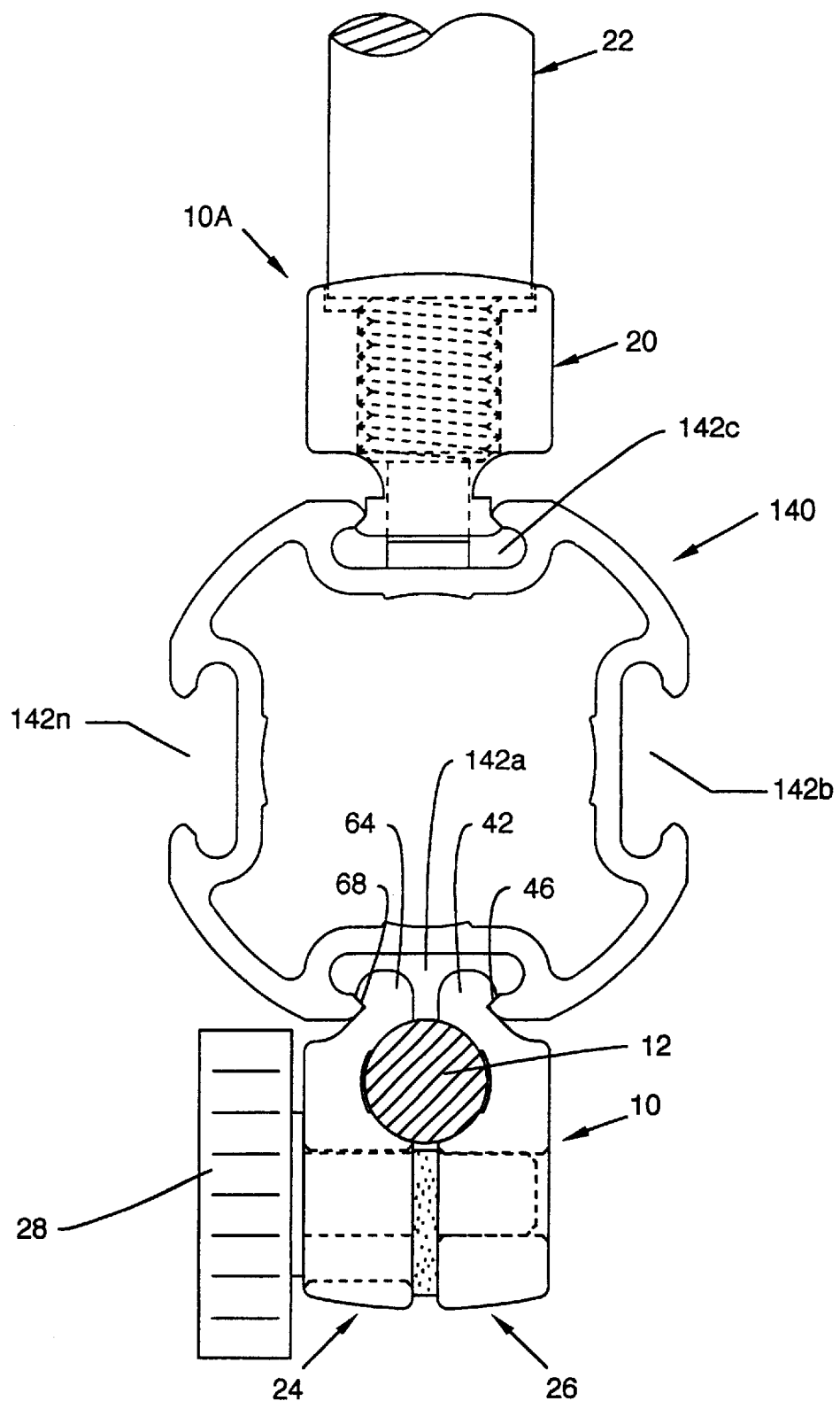

FIG. 11 illustrates a top view of both the clamp assembly 10 and the clamp assembly 10A secured, according to the teachings of the invention, to a slotted structure 140 having a plurality of slots 142a–142n distributed thereabout. The present invention can be incorporated in attachment to any suitable slot on any structure.

Various modifications can be made to the present invention without departing from the apparent scope hereof.

PARTS LIST

| | |
|---|---|
| 10 | clamp assembly |
| 10A | clamp assembly |
| 12 | mounting rod |
| 14 | extruded geometrically configured tube or host structure |
| 16 | post |
| 17 | base |
| 18 | auxiliary mounting structure |
| 20 | one-piece clamp body |
| 22 | mounting rod |
| 24 | left jaw |
| 26 | right jaw |
| 28 | actuating knob |
| 30 | inner planar surface |
| 32 | arcuate channel |
| 34 | top planar surface |
| 36 | bottom planar surface |
| 38 | planar end surface |
| 40 | exterior planar surface |
| 42 | tooth |
| 44 | strut |
| 46 | groove |
| 48 | threaded hole |
| 50 | threaded shaft |
| 52 | inner planar surface |
| 54 | arcuate channel |
| 56 | top planar surface |
| 58 | bottom planar surface |
| 60 | planar end surface |
| 62 | exterior planar surface |
| 64 | tooth |
| 66 | strut |
| 68 | groove |
| 69 | gripping edge |

-continued

PARTS LIST

| | |
|---|---|
| 70 | body hole |
| 71 | gripping edge |
| 72 | sponge rubber pad |
| 74 | sponge rubber pad |
| 80a–n | segmented arcuate portions |
| 82 | cylindrical structure |
| 84a–n | struts |
| 86a–n | slots |
| 92 | block member |
| 94 | upper engagement tab |
| 96 | lower engagement tab |
| 98 | strut |
| 100 | curved side |
| 102 | curved side |
| 104 | flat surface |
| 106 | flat surface |
| 108 | access groove |
| 110 | access groove |
| 112 | threaded hole |
| 114 | threads |
| 116 | recess |
| 118 | protrusion |
| 120 | plastic tip element |
| 122 | groove |
| 124 | angled tab |
| 126 | angled tab |
| 128 | planar surface |
| 130 | slot |
| 140 | slotted structure |
| 142a–n | slots |

It is claimed:

1. A clamp assembly for attachment to a host structure at a slot in the host structure defined by surfaces of the host structure, comprising:

a. a two-piece clamp body composed of two opposing jaws each having engagement means for entering into said slot in said host structure, said two opposing jaws being held together by at least one resilient pad fastened thereto; and, b. tightening means for bringing said engagement means of said two opposing jaws, when entered into said slot in said host structure, into tight engagement with said surfaces of said host structure to thereby affix said two-piece clamp body securely to said host structure.

2. The clamp assembly as defined in claim 1, wherein each of said two opposing jaws further has an arcuate channel for partially surrounding a circular mounting rod.

3. The clamp assembly as defined in claim 2, wherein each said arcuate channel is located between said engagement means and said tightening means.

* * * * *